United States Patent [19]
Martin

[11] 3,825,085
[45] July 23, 1974

[54] PRICE COMPUTING SCALE WITH PARITY CHECK OF PRICE ENTRY

[75] Inventor: Orval J. Martin, Toledo, Ohio

[73] Assignee: Reliance Electric Company, Toledo, Ohio

[22] Filed: Sept. 20, 1973

[21] Appl. No.: 398,969

[52] U.S. Cl. .............. 177/3, 177/25, 177/DIG. 1, 177/DIG. 6
[51] Int. Cl. .................. G01g 23/38, G01g 23/22
[58] Field of Search ........ 177/25, 3, DIG. 1, DIG. 6

[56] References Cited
UNITED STATES PATENTS

| | | | |
|---|---|---|---|
| 3,447,617 | 6/1969 | Susor et al. | 177/DIG. 1 |
| 3,521,039 | 7/1970 | Susor | 177/DIG. 1 |
| 3,528,089 | 9/1970 | Martin | 177/25 X |
| 3,741,324 | 6/1973 | Boshinski et al. | 177/DIG. 1 |

Primary Examiner—George H. Miller, Jr.
Attorney, Agent, or Firm—Thomas H. Grafton

[57] ABSTRACT

A computing weighing scale system comprising photosensitive means for setting up selected price factors in the scale's computer and interlock means for preventing initiation or completion of the system's operating cycle, which includes computing and printing, if part of the photosensitive means is defective or is missing or is plugged with foreign material.

6 Claims, 7 Drawing Figures

PRICE COMPUTING SCALE WITH PARITY CHECK OF PRICE ENTRY

BACKGROUND OF THE INVENTION

1. Field of the Invention

The invention relates to electrical or electronic computing weighing scales which compute the values of packages of goods according to the weights of the packages and arbitrarily selected unit price factors and print tickets, labels or the like bearing such computed values and selected prices together with net weights, dates, store codes, commodity names and commodity grades.

2. Description of the Prior Art

U.S. Pat. No. 3,459,272 issued Aug. 5, 1969 in the name of William C. Susor discloses a computing weighing scale in which selected unit price factors are entered into the scale's computer either by manually operated selector switches or by photosensitive means. A shorted photocell in the photosensitive means produces an incorrect unit price input to the computer and an interlock is disclosed which detects attempts to enter excess unit price. U.S. Pat. No. 3,528,089 issued Sept. 8, 1970 in the name of Orval J. Martin discloses an identical computing weighing scale with identical photosensitive price entry means. An interlock is disclosed which detects when part of the photosensitive price entry means burns out.

SUMMARY OF THE INVENTION

Specifically, the invention envisions in a computing weighing scale system comprising photosensitive means for setting up selected price factors in the scale's computer, interlock means for preventing initiation or completion of the system's operating cycle, which includes computing and printing, if part of the photosensitive means is defective or is missing or is plugged with foreign material. The interlock uses a parity check technique in which parity bits are added to price bits used by the photosensitive means for entering the selected price factor in the computer in patterns according to a binary code. If the photosensitive means fails to pass a parity check according to a verification code in which the sum of the price and parity bits for each number place in the price factor is always even or always odd, an inhibit signal is produced.

The definitions of "parity" and "parity bit" according to "IEEE Standard Dictionary of Electrical and Electronics Terms," copyrighted 1972 are as follows:

1. Parity

Pertaining to the use of a self-checking code employing binary digits in which the total number of ones (or zeros) in each permissible code expression is always even or always odd. A check may be made for either even parity or odd parity.

2. Parity Bit (Computing Systems)

A binary digit appended to an array of bits to make the sum of all the bits always odd or always even. Parity Check is a redundancy check technique based on an odd or even number of binary ones in some grouping of binary digits. For instance, in the binary representation of a character, a parity bit is made either zero or one, whichever is required to make the number of ones in the character an even number (even parity) or an odd number (odd parity). Use of odd or even parity checking depends, usually, on design criteria.

The objects of this invention are to improve computing weighing scales, to improve the techniques of setting up selected price factors in the computers of such scales, and to provide an interlock guarding against improper operation in such scales in the event that part of the photosensitive means setting up such selected price factors is missing or is plugged with foreign material or includes a shorted photocell or includes an open photocell.

DESCRIPTION OF THE PREFERRED EMBODIMENT

Figure 1:
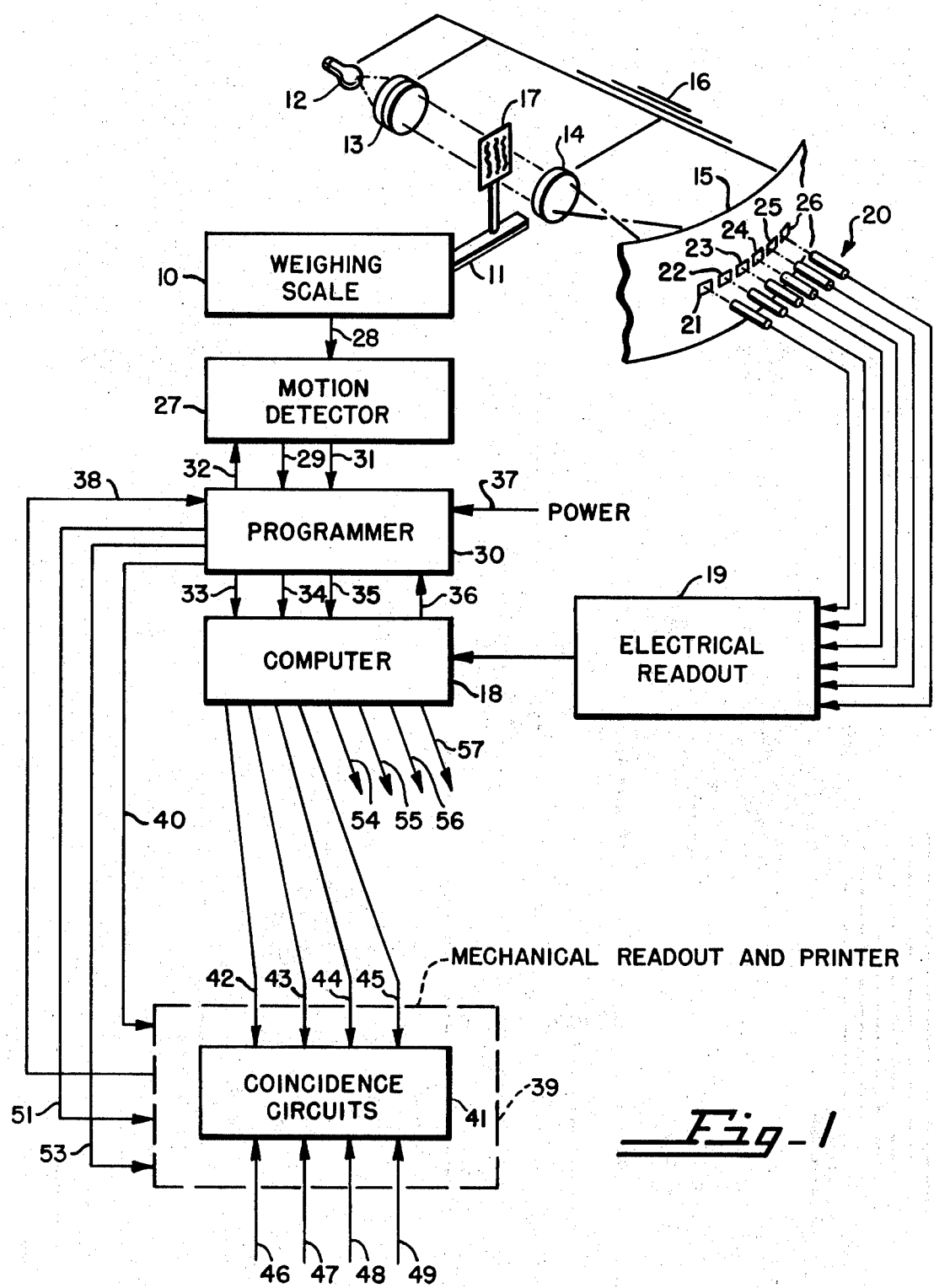
FIG. 1 is a schematic diagram illustrating the general organization of an electrical weighing, computing and printing system with photosensitive means for setting up selected unit price factors in the computer combined therewith.

Referring to FIG. 1, a computing weighing scale 10 includes a lever 11 and an optical projection system which diagrammatically includes a light source 12, a condensing lens 13, a projection lens 14 and a photocell mask 15. The light source 12, the lenses 13 and 14, and the mask 15 are connected to ground as shown at 16 (e.g. base of weighing scale), the mask 15 being rigidly mounted with respect to the projection optics. A coded chart 17 is moved by the load-responsive lever 11 in the optical projection system, the chart 17, hence, being condition responsive. The computer 18 which is disclosed in U.S. Pat. No. 3,453,422 issued July 1, 1969 in the name of William C. Susor receives weight information from the scale and multiplies the weight of an article upon the scale by the unit price of such article to compute the value of such article. The computer 18 also multiplies such unit price times one so that it can produce a unit price output. The computer 18 has a weight input which is compatible with the parallel 1-2-4-8 binary coded decimal output of an electrical readout 19 in circuit therewith.

The chart 17 has a matrix of coded markings arranged in vertical bands so that the relative position thereof may be read by a bank of readout photocells 20, with one cell being associated with each column, providing an indication of the weight upon the scale. The output of the photocells is applied to the electrical readout 19, which makes available weight information to the input of the computer 18. The mask 15 is shown as being slitted at 21–26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of 14 photocells in the photocell bank 20, only six of the 14 photocells being shown for the sake of simplicity. 14 photocells are enough to read out a chart capacity of 25.00 pounds.

The weighing scale 10 is connected operatively to a motion detector 27 through a connection 28 which prevents erroneous weight readouts from taking place when the weighing mechanism is in motion. The motion detector 27 applies no motion signals through a lead 29 to a programmer 30 which is disclosed in U.S. Pat. No. 3,384,193 issued May 21, 1968 in the names of W. C. Susor and O. J. Martin. The motion detector 27 also applies motion signals through a lead 31 to the programmer 30 and receives conditioning signals from the programmer 30 through a lead 32.

The programmer 30 applies reset signals and command to compute signals through leads 33, 34 and 35, respectively to the computer 18 and receives program advance signals through a lead 36 from the computer 18. The programmer 30 also receives power on signals through a lead 37 and coincidence check signals through a lead 38. The coincidence check signals indicate that the computer 18 and the read out positions of the number wheels in a mechanical readout and printer 39 agree. The programmer 30 also applies a signal through a lead 40 to the mechanical readout and printer 39 commanding it to print.

The programmer 30 is used in conjunction with a mechanical readout which is disclosed in U.S. Pat. No. 3,416,151 issued Dec. 10, 1968 in the name of C. E. Adler. The readout includes a combination of a series of modules each comprising a detent wheel which is directly gear connected to a commutator and to a print wheel. Each module indicates the digits of a particular denominational order. When the turning print wheel approaches the correct indicating position, a stopping latch intercepts the correct one of the teeth of the detent wheel to arrest the detent wheel. Such readout also includes coincidence circuits 41 which receive 1-2-4-8 binary coded unit price signals from the computer 18 through leads 42–45 and 1-2-4-8 binary coded decimal signals through leads 46–49 indicative of the positions of the commutators. The detent wheels and thus the print wheels are stopped when the coincidence circuits determine that the wheels are in the correct indicating positions. The readout also includes a solenoid which when it receives a signal through a lead 51 permits a new reading to be made and a solenoid which when it receives a signal through a lead 53 unlocks the unit price indicating modules which otherwise remain locked to accomplish repeat printing without recycling such unit price indicating modules. Similarly, the coincidence circuits 41 receive 1-2-4-8 binary coded decimal value signals from the computer 18 through leads 54–57 and 1-2-4-8 binary coded decimal signals through leads not shown indicative of the positions of the commutators.

Figure 3:
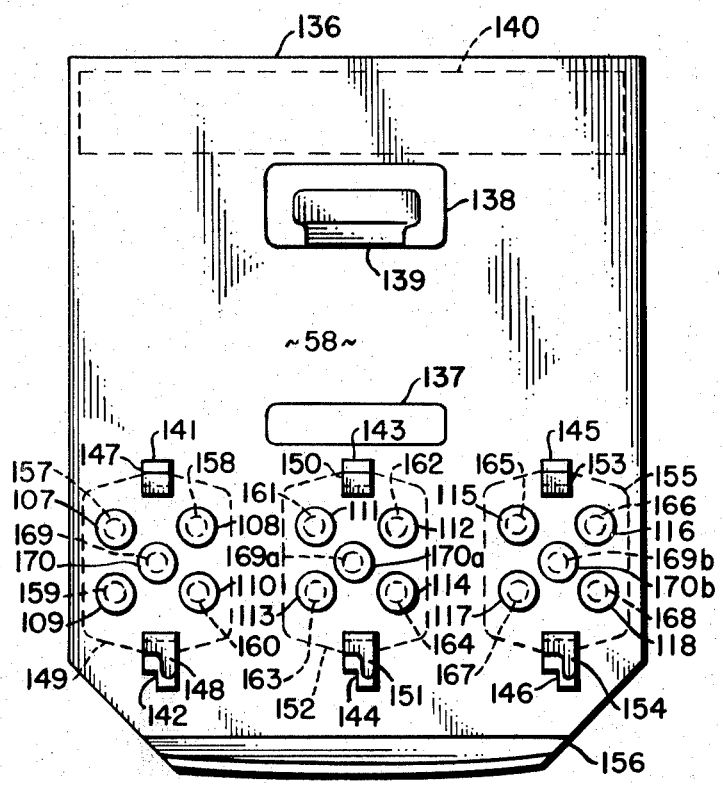
FIG. 3 is a plan view of a commodity name printing plate defining openings with masks covering selected openings in a pattern according to a selected price factor and in combination with photocells which are operated by the plate in accordance with the pattern.
Figure 6:
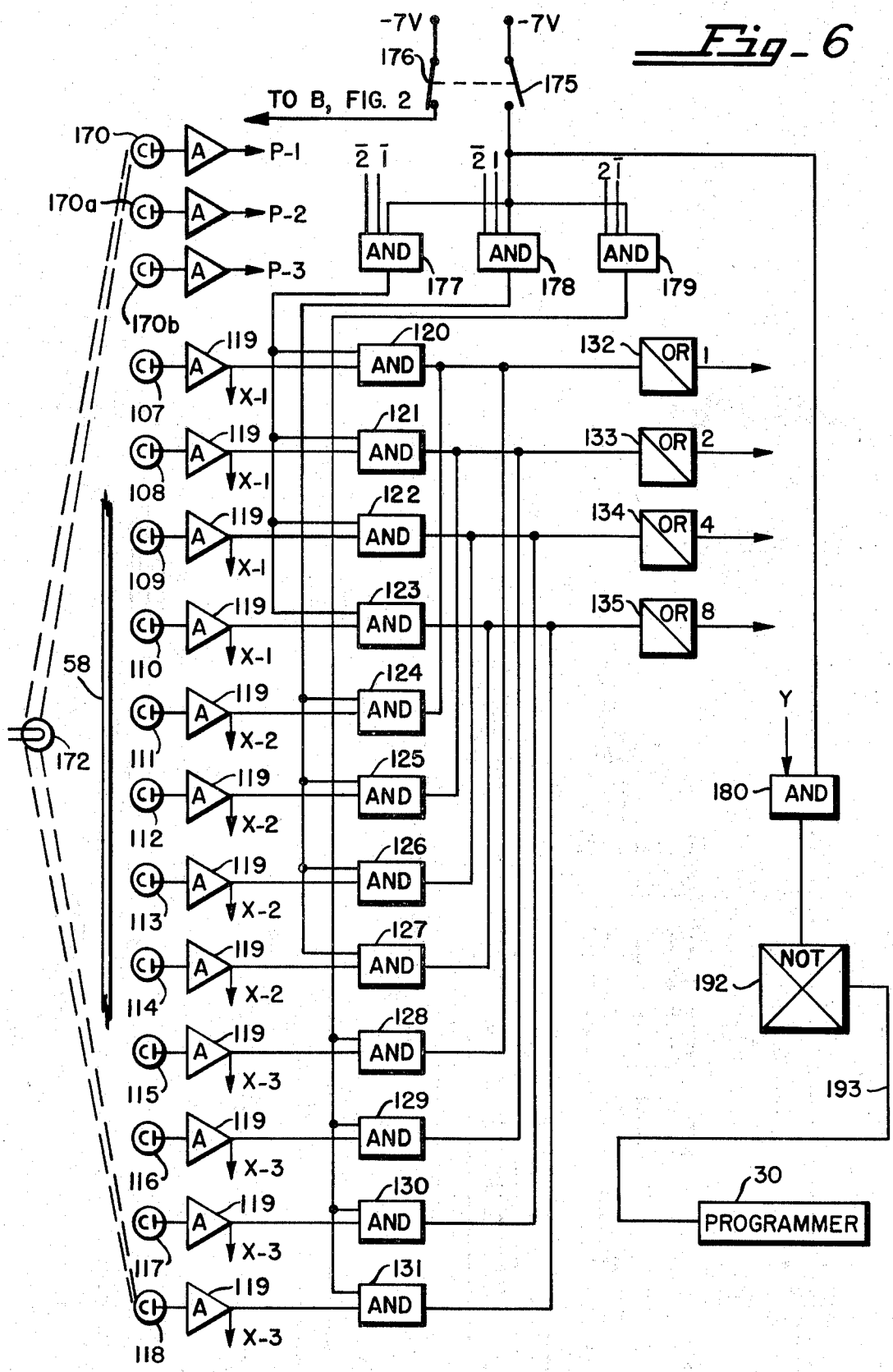
FIG. 6 is a block diagram showing how the photocells illustrated in FIG. 3 are in circuit with the computer and the programmer shown in FIG. 1.

The mechanical readout is used in conjunction with a printer which is disclosed in U.S. Pat. No. 3,334,583 issued Aug. 8, 1967 in the name of Clarence E. Adler. The printer includes a commodity name printing plate which is similar in its printing function to a printing plate 58 (FIGS. 3 and 6).

Figure 2:
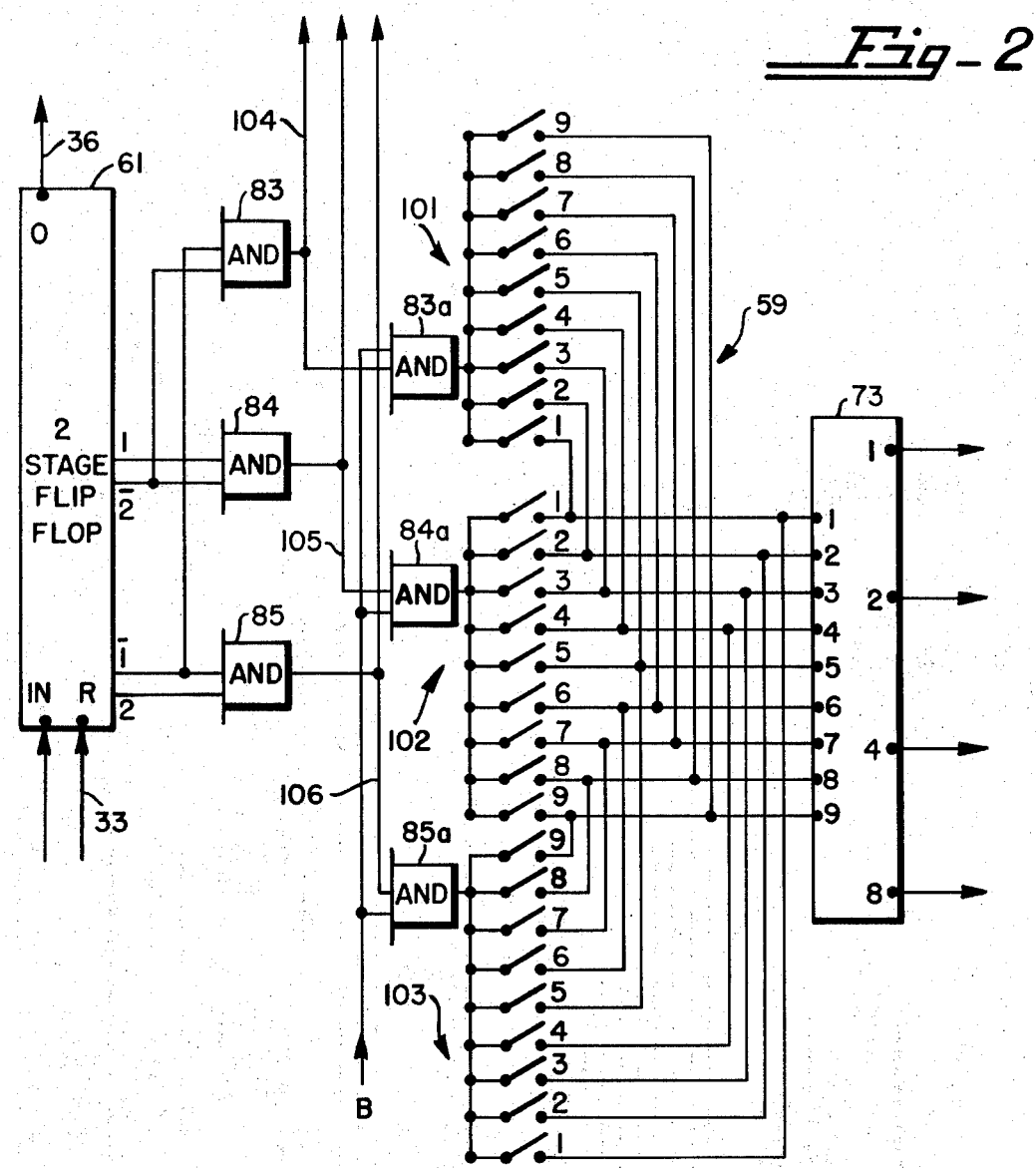
FIG. 2 is a diagram of part of the computer shown in FIG. 1 illustrating the price factor entry section of the computer.

The computer 18 includes a price entry section 59 (FIG. 2) having a two-stage flip-flop 61 which counts to three by the following code:

| 1 | 2 | 4 | 8 | Count | Binary output |
|---|---|---|---|-------|---------------|
| 0 | 0 | 0 | 0 | 0 | $\overline{1}\,\overline{2}$ — not 1, not 2. |
| 1 | 0 | 0 | 0 | 1 | $1\,\overline{2}$ — true 1, not 2. |
| 0 | 1 | 0 | 0 | 2 | $\overline{1}\,2$ — not 1, true 2. |
| 1 | 1 | 0 | 0 | 3 | $1\,2$ — true 1, true 2. |

The price entry section or circuit 59 has a capacity of $9.99. The least significant place in the selected price per pound is multiplied by each place in the weight figure using the least significant place first, etc. The price entry circuit includes a bank of 9 cents contacts 101, a bank of nine dimes contacts 102, and a bank of 9 dollars contacts 103 which are closed by setting price knobs or levers to selected positions. The contacts are in circuit with the respective ones of terminals 1–9 in a diode matrix 73. The AND gate 83 when enabled by the two-stage flip-flop 61 being in its reset state applies an output to a lead 104 (controls partial product gating not shown) and to an AND gate 83a having its output connected to the bank of cents contacts 101; the AND gate 84 when enabled by the two-stage flip-flop 61 being in its count one state applies an output to a lead 105 (controls partial product gating not shown) and to an AND gate 84a having its output connected to the bank of dimes contacts 102; and the AND gate 85 when enabled by the two-stage flip-flop 61 being in its count two state applies an output to a lead 106 (controls partial product gating not shown) and to an AND gate 85a having its output connected to the bank of dollars contacts 103.

The decimal price entry, e.g., a price of $1.12, would connect a closed contact in the bank 101 to the "2" terminal of the diode matrix 73, a closed contact in the bank 102 to the "1" terminal of the diode matrix 73, and a closed contact in the bank 103 to the "1" terminal of the diode matrix 73, is changed to 1-2-4-8 binary coded decimal by the diode matrix 73. Only one bank of contacts is energized at a time as programmed by the two-stage flip-flop 61. When price contacts are closed, output terminals "1," "2," "4" and "8" of the diode matrix 73 apply binary coded decimal inputs to the rest of the computer as shown in the above U.S. Pat. No. 3,453,422. Zero places in the price entry are entered by opening all of the contacts in the respective contact banks 101–103.

Figure 5:
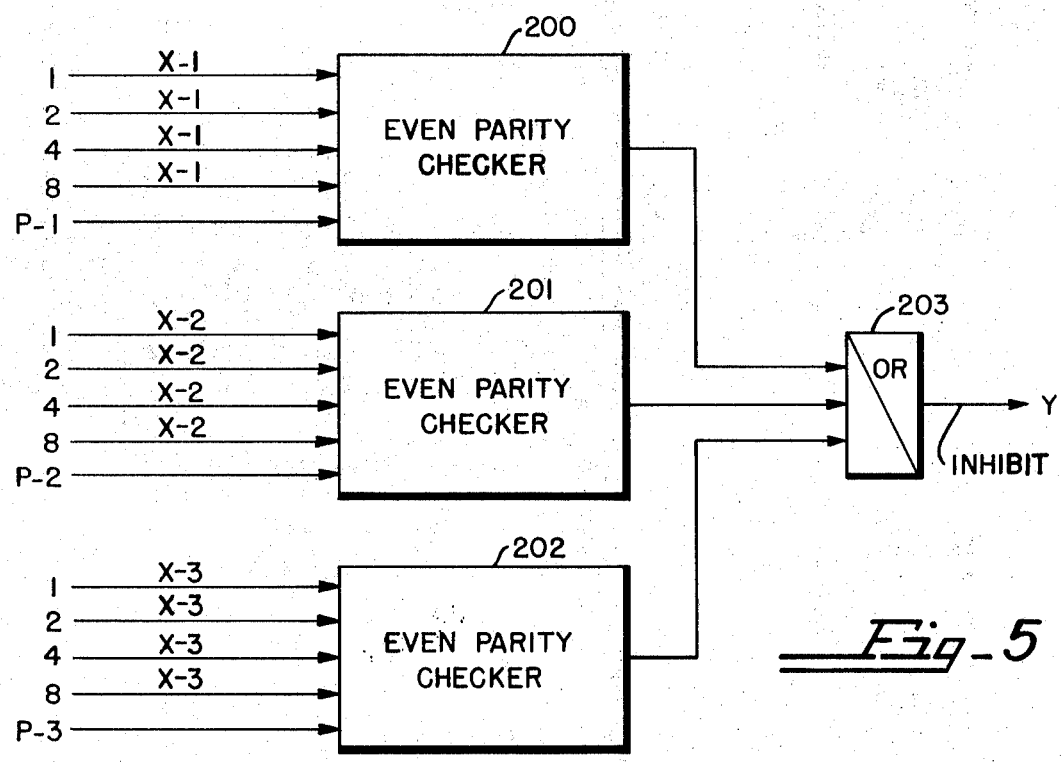
FIG. 5 is a block diagram of an interlock circuit for preventing initiation or completion of the system's operating cycle if the plate or one or more of the masks shown in FIG. 3 is missing, or if one or more of the plate or mask holes shown in FIGS. 3 and 4 is plugged with foreign material.

The computer 18 which is disclosed in the above U.S. Pat. No. 3,453,422 is modified to have the selected price factors entered into the computer either by the manually operated selector switches 101–103 in a first mode of operation or by photosensitive means in a second mode of operation. This modification requires the addition of AND gates 83a–85a which are controlled by the AND gates 83–85, respectively. The photosensitive means includes 4 cents photocells 107–110, four dimes photocells 111–114 and 4 dollars photocells 115–118. Amplifiers 119 apply the amplified photocell outputs to AND gates 120-131, respectively. The outputs of AND gates 120, 124 and 128 are applied to an OR gate 132; the outputs of AND gates 121, 125 and 129 are applied to an OR gate 133; the outputs of AND gates 122, 126 and 130 are applied to an OR gate 134; and the outputs of AND gates 123, 127 and 131 are applied to an OR gate 135. The outputs of the OR gates 132-135 are applied to the output terminals "1," "2," "4" and "8," respectively, of the diode matrix 73 (FIG. 2) for the application of binary coded decimal price entry inputs to the rest of the computer. The outputs of the amplifiers 119 are also applied to the inputs of EVEN PARITY CHECKERS 200-202 (FIG. 5). Amplifier outputs X-1 (cents) are applied to checker 200; amplifier outputs X-2 (dimes) are applied to checker 201; and amplifier outputs X-3 (dollars) are applied to checker 202.

The commodity name printing plate 58 includes a flat body 136 defining an opening 137 and an opening 138 at which a tab 139 is located which is bent up as viewed in FIG. 3 out of the plane of the flat body 136, and carries printing type 140 for printing the commodity name. The flat body 136 also defines two holes 141 and 142 for the reception of legs 147 and 148, respectively, of a cents mask 149, two holes 143 and 144 for the reception of legs 150 and 151, respectively, of a dimes mask 152, and two holes 145 and 146 for the reception of legs 153 and 154, respectively, of a dollars mask 155, and has a handle 156 bent out of its plane. The flat body 136 also defines 4 cents holes 157-160, four dimes holes 161-164, and 4 dollars holes 165-168. Photocells 107-118 look at holes 157-168, respectively. The flat body 136 also defines parity interlock holes 169, 169a and 169b. Parity interlock photocells 170, 170a and 170b look at the holes 169, 169a and 169b, respectively.

The commodity name printing plate 58 except for the holes 141-146, 157-168 and 169, 169a and 169b is like the printing plate disclosed in the above U.S. Pat. No. 3,334,583 and is secured in the printer disclosed in such patent in the same manner as the prior printing plate is secured in the printer, i.e., by means of two magnets shown in such patent, the hole 137 in the printing plate 58 receiving a finger projecting from the printer and the tab 139 on the printing plate 58 being received in a hole in the printer as an aid in locating the printing plate and keeping it stable. Both printing plates function to print the name of the commodity. The magnets (magnets 166 in FIG. 9 of U.S. Pat. No. 3,334,583) are spaced apart and between them in the area shown in FIG. 9 of the patent above the block 161 as viewed in such FIG. 9 are located the 15 photocells 107-118 and 170, 170a and 170b in the arrangement shown in FIG. 3. The printing plate 58 is held by the magnets closely juxtaposed to the photocells, the printing plate 58 being located relative to the photocells as shown in FIG. 3 when it is in operative position in the printer. A light source 172 (FIG. 6) is formed by two light bulbs wired in series which are supported in brackets that are not shown but which are mounted from the bar 179 shown in FIG. 4 in the above U.S. Pat. No. 3,334,583 so that light bulbs are juxtaposed to the ticket deflector 165 shown in such FIG. 4 in the patent. When the printing plate 58 is in operative position and when the pivotable frame 142 shown in the above U.S. Pat. No. 3,334,583 which carries the photocells 107-118, 170, 170a and 170b and the printing plate 58 is in its operative position, the light source 172 illuminates the photocells to activate them through those of the holes 157-169, 169a and 169b in the printing plate 58 which are uncovered.

The masks 149, 152 and 155 function to cover selected ones of the openings 157-168 in the printing plate 58 in a pattern according to a selected price factor. There are four holes 157-168 for each of the three places in the price and by giving the four holes in each set values of 1-2-4-8, respectively, decimal prices are converted to 1-2-4-8 binary coded decimal values. The legs 147-148, 150-151, and 153-154 of the masks 149, 152 and 155 are spaced apart slightly more than the distance between the holes in the printing plate 58 which receive them so that when they are forced by finger pressure into the holes the masks are held in place. However, the masks can be removed by pulling them away from the printing plate. Holes 142, 144 and 146 and their cooperating mask legs are shaped differently than are the respective holes 141, 143 and 145 and their cooperating legs to ensure proper orientation of the masks. Holes 157-160 correspond, respectively, to 1-2-4-8 binary coded decimal numbers in the cents place and photocells 107-110, accordingly, correspond, respectively, to the 1-2-4-8 binary coded decimal numbers in the cents place; holes 161-164 correspond, respectively, to 1-2-4-8 binary coded decimal numbers in the dimes place and photocells 111-114, accordingly, correspond, respectively, to the 1-2-4-8 binary coded decimal numbers in the dimes place; and holes 165-168 correspond, respectively, to 1-2-4-8 binary coded decimal numbers in the dollars place and photocells 115-118, accordingly, correspond, respectively, to the 1-2-4-8 binary coded decimal numbers in the dollars place. Each of the masks 149, 152 and 155 bears an identifying decimal number (not shown). In order to set up a printing plate 58 to enter a price of $1.27, for example, (the price set up depends on the current price per pound of the commodity whose name is to be printed by the printing type 140), the operator clips a "1" mask over holes 165-168 which mask has a hole ("1" mask 155 shown in FIG. 4) exposing the hole 165 to produce a "1" binary coded decimal output, clips a "2" mask over holes 161-164 which mask has a hole exposing the hole 162 to produce a "2" binary coded decimal output, and clips a "7" mask over holes 157-160 which mask has three holes exposing the holes 157-159 to produce a "7" binary coded decimal output.

The masks 149, 152 and 155 further function to cover the parity holes 169, 169a and 169b in a pattern of parity bits according to a verification code for each number place in the price factor in which the total number of price and parity bits in each permissible code expression is always even or always odd, as hereinafter described. The amplified outputs P-1, P-2 and P-3 (FIG. 6) of the parity photocells 170, 170a and 170b are applied to the checkers 200-202 (FIG. 5). Power is applied to AND gates 177, 178 and 179 from a − 7 volts source through a contact 175. Contact 175 is mechanically connected to a contact 176 which connects a − 7 volts source to point "B" in FIG. 2. When contact 175 is open, contact 176 is closed and vice versa.

The mode of operation is selected by the contacts 175-176. When contact 175 is open and contact 176 is closed the scale is in manual mode and when the positions of the contacts 175-176 are reversed the scale is in photosensitive mode.

In manual mode (contact 175 open and contact 176 closed) power is applied at point "B" (FIG. 2) applying power to AND gates 83a-85a. Price switches 101-103 are used to enter the selected price into the computer. As described in the above U.S. Pat. No. 3,453,422, the AND gate 83 is enabled by the "1" and "2" outputs of the reset flip-flop 61 (FIG. 2) enabling in turn the added AND gate 83a to select the cents place in the price per pound to be multiplied first (price entry produces the 1-2-4-8 binary coded decimal output from the diode matrix 73). Then the AND gate 84 is enabled by the "$\overline{2}$" and "1" outputs of the flip-flop 61 enabling in turn the added AND gate 84a to select the dimes place in the price per pound to be multiplied next and then the AND gate 85 is enabled by the "2" and "$\overline{1}$" outputs of the flip-flop 61 enabling in turn the added AND gate 85a to select the dollars place in the price per pound to be multiplied next.

In photosensitive mode (contact 175 closed and contact 176 open) power is applied to the AND gates 177-180 (FIG. 6). When commodity name printing plate 58 (FIGS. 3 and 6) is in operative position in the printer, the AND gates 177-179 are enabled by the same respective outputs from the flip-flop 61 as are the AND gates 83-85 as indicated at the input leads to the AND gates 177-179 in FIG. 6 to select the places in the price per pound to be multiplied one at a time (partial products). Enabled cents AND gate 177 enables cents AND gates 120-123 (partially enabled by 1-2-4-8 binary coded decimal signals from the photocells 107-110) which apply inputs to the OR gates 132-135 that have their outputs connected to the "1," "2," "4" and "8" output terminals of the diode matrix 73 (FIG. 2) to enter the cents place in the price entry into the computer by photosensitive means controlled by the printing plate 58. This eliminates the chance of operator's mistakes in entering the price through the switches 101-103. Once the supervisor has set up the correct price on the printing plate 58 by clipping on the masks, the action of the operator in putting a "hamburg" printing plate in the printer, for example, sets up the correct "hamburg" price per pound in the computer. Enabled dimes AND gate 178 enables dimes AND gates 124-127 (partially enabled by 1-2-4-8 binary coded decimal signals from the photocells 111-114) which apply inputs to the OR gates 132-135 to enter the dimes place in the price entry into the computer by the photosensitive means. Enabled dollars AND gate 179 enables dollars AND gates 128-131 (partially enabled by 1-2-4-8 binary coded decimal signals from the photocells 115-118) which apply inputs to the OR gates 132-135 to enter the dollars place in the price entry into the computer by the photosensitive means. When an INHIBIT signal from an OR gate 203 (FIG. 5) is present on input lead Y of the partially enabled AND gate 180 (output lead Y FIG. 5 connected to input lead Y (FIG. 6), an output signal is applied to the input of a NOT gate 192, which inverts the signal and applies it through a lead 193 to the programmer 30.

The output of the NOT gate 192 is connected to the input of an AND gate in the programmer 30 shown in the above U.S. Pat. No. 3,384,193 (AND gate 67 in the patent), which has its output connected to the "IN" terminal of the two-stage flip-flop 54 shown in the patent, through the switches 69, 68, 71 and 207 shown in the patent (AND gate 67, flip-flop 54, switches 69, 68, 71 and 207 are part of the programmer 30 FIGS. 1 and 6). As described in such U.S. Pat. No. 3,384,193, an interruption of the signal applied through the switches to the AND gate 67 shown in the patent prevents advance of the programmer 30 or interrupts the program by resetting the programmer 30. Similarly, since the output of the NOT gate 192 (FIG. 6) is applied through the lead 193 as an input to the programmer 30 through the above existing circuitry, a plus input to the NOT gate 192 (plus input to NOT gate 192 results in an inverted, i.e., minus output) prevents advance of the programmer 30 or interrupts the program by resetting the programmer 30; this in turn prevents printing by preventing or interrupting computing.

The interlock of the invention applies an inhibit signal, to prevent initiation or completion of the system's operating cycle, to AND gate 180 if the printing plate 58 or one or more of the masks 149, 152 and 155 is missing from the plate 58 or if one or more of the holes in the plate or in the masks is plugged with, for example, hamburg. Also, in some combinations the interlock applies the inhibit signal in the case of shorted or open photocells. A shorted cell looks like a plugged hole, and an open cell looks like a covered hole even though the hole is open.

The verification code for each number place in the price factor is as follows (P stands for parity):

|  | 8 | 4 | 2 | 1 | P |
|---|---|---|---|---|---|
| Decimal Price 1 | 0 | 0 | 0 | 1 | 1 |
| 2 | 0 | 0 | 1 | 0 | 1 |
| 3 | 0 | 0 | 1 | 1 | 0 |
| 4 | 0 | 1 | 0 | 0 | 1 |
| 5 | 0 | 1 | 0 | 1 | 0 |
| 6 | 0 | 1 | 1 | 0 | 0 |
| 7 | 0 | 1 | 1 | 1 | 1 |
| 8 | 1 | 0 | 0 | 0 | 1 |
| 9 | 1 | 0 | 0 | 1 | 0 |
| 0 | 0 | 0 | 0 | 0 | 0 |

The permissible code expression is always even. As indicated, a zero decimal number clip covers all the holes. Use of odd or even parity checking is a matter of choice. In the above permissible code expression, the sum of the price and parity bits in each horizontal line is even. The detection of even parity produces no inhibit signal. However, if in the vertical column headed "P," the "1s" were changed to "0s" and vice versa, the sum of the price and parity bits in each horizontal line would be odd. Then a check for odd parity could be made with the same results as hereinafter described as the check for even parity.

Using the above example of the selected price per pound of $1.27, the operator clips the "1" dollar mask 155 over holes 165-168 and 169b in the printing plate 58 which mask has a hole ("1" mask 155 shown in FIG. 4) exposing the hole 165 to produce a "1" binary coded decimal price output and a parity hole P exposing the parity hole 169b in the printing plate 58. The single "1" price bit is shown in the above verification code table and the parity bit "1" also is shown in the table. The sum of the 2 bits is even. Since the permissible code expression always is even, no inhibit signal as hereinafter described is produced. If the mask 155 was missing, the sum of the 5 bits (five holes in printing plate exposed) would be odd and an inhibit signal would be produced as hereinafter described. If foreign material, such as hamburg, plugged one hole in the plate 58 or in the mask 155, the sum of the bits would be odd and an inhibit signal would be produced.

Continuing with the example of $1.27 per pound, the operator also clips a "2" dimes mask 152 over holes 161–164 and 169a in the printing plate 58 which mask has a hole exposing the hole 162 to produce a "2" binary coded decimal price output and a parity hole P exposing the parity hole 169a in the printing plate 58. The single "1" price bit and the parity bit "1" are shown in the above verification table. The sum of the 2 bits is even. The operator also clips a "7" cents mask 149 over holes 157–160 and 169 in the plate 58 which mask has three holes exposing the holes 157–159 to produce a "7" binary coded decimal price output and a parity hole P exposing the parity hole 169 in the printing plate 58. Again as shown in the above verification code table, the sum of the 4 bits is even.

Figure 4:
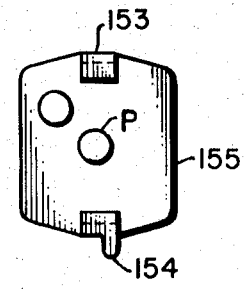
FIG. 4 is a plan view of one of the masks shown in FIG. 3.

The interlock circuit for preventing initiation or completion of the system's operating cycle if the plate or one or more of the masks shown in FIG. 3 is missing from the printing plate or if one or more of the plate or mask holes shown in FIGS. 3 and 4 is plugged is shown in FIG. 5. The 1-2-4-8 binary coded decimal price bits are applied in three arrays to the checkers 200–202 (X-1 cents, X-2 dimes and X-3 dollars). The parity bit P-1 in the cents place produced by the amplified output of the photocell 170 is applied to the lead identified as P-1 in FIG. 5, the parity bit P-2 in the dimes place produced by the amplified output of the photocell 170a is applied to the lead identified as P-2 in FIG. 5, and the parity bit P-3 in the dollars place produced by the amplified output of the photocell 170b is applied to the lead identified as P-3 in FIG. 5.

The parity checkers 200–202 produce outputs if one or three or five inputs are received. With reference to the above verification code table, a price input of one, for example, in any one of the three decimal places of the selected price per pound and the parity bit P cause inputs on the "1" and "P-1" or "P-2" or "P-3" leads of checker 200 or 201 or 202 depending on the respective decimal place. Since the input is even, the checker 200 or 201 or 202 produces no output. The checkers 200–202 are in circuit with the OR gate 203 which produces an inhibit signal whenever one of the checkers 200–202 produces an output. The inhibit signal is produced on the lead indicated Y in FIG. 5; output lead Y is connected to AND gate 180 by the input lead Y in FIG. 6. As described above, an input signal to the AND gate 180 results in the prevention of the advance of the programmer 30 or the program of the programmer 30 is interrupted, i.e., the interlock prevents or interrupts computing and thus printing if even parity is not detected.

The printing plate 58 defines five openings (four for price entry and one for parity check) for each number place in the price. The masks 149, 152 and 155 define openings in accordance with the above verification code table and function to cover selected price openings in the plate 58 in a pattern of binary price bits according to the selected price factor and also to cover the parity openings in the plate 58 in a pattern of parity bits according to the verification code. For each number place in the price factor, the total number of price and parity bits in each permissible code expression is always even. The circuit shown in FIG. 5 produces an inhibit signal in response to the detection of a code expression which is not permissible. The interlock means prevents initiation or completion of the operating cycle in the absence of the plate or one or more of the masks or in the presence of one or more plugged openings in the plate or mask. Conceivably there could be a plurality of plugged openings arriving at a permissible code expression. For example, two plugged holes in the printing plate in the "7" place as shown in the code table would produce a permissible code expression. However, as a practical matter, most failures have occurred in prior systems not using the interlock of the invention because of a single plugged hole in a plate or mask. The interlock of the invention is 100 percent effective against all single plugged holes and the vast majority of plural plugged holes, and is digital data verification means which verifies that the selected price factor corresponds to the entered price factor. The selection, for example, of a plate set up to enter $1.27 will not enter $1.27 if a hole is plugged.

Figure 7:
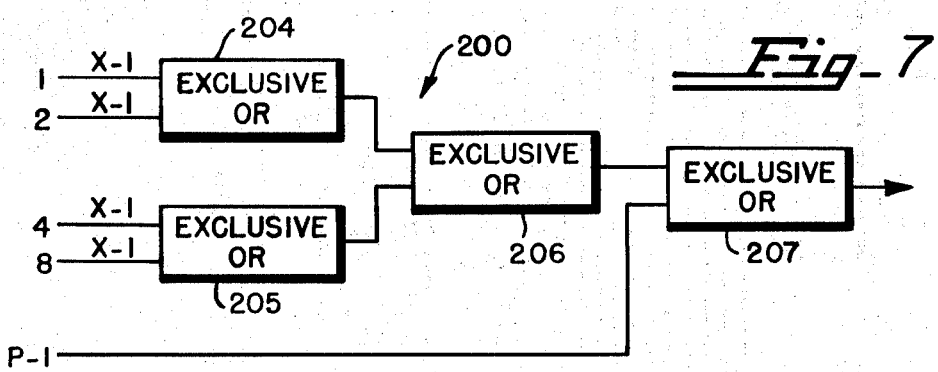
FIG. 7 is a diagram of the circuitry of one of the "EVEN PARITY CHECKERS" shown in FIG. 5.

The even parity checkers 200–202 are alike. EVEN PARITY CHECKER 200 is shown in detail in FIG. 7. Gates 204, 205, 206 and 207 are Exclusive-OR gates. An Exclusive-OR gate is a logic operator in which the output is true if either input is true, but not both. If both inputs are true, or if both inputs are false, the output will be false. Binary coded bits 1 and 2 feed into gate 204, and binary coded bits 4 and 8 feed into gate 205. The outputs of gates 204 and 205 feed into gate 206. The output of gate 206 and the parity bit, P, feed into gate 207. As a result, the output of gate 207 will be a "0" (false) if the input BCD character is valid, as shown in the verification code table. If the number of input "1s" is odd (1, 3 or 5), the output will be a "1" (true), and will represent an inhibit signal. The outputs from the three parity check circuits 200–202 are combined in OR gate 203 (FIG. 5). An inhibit signal is present to the NOT gate 192 (FIG. 6) if a parity error is found in any one of the parity check circuits.

It is to be understood that the above description is illustrative of this invention and that various modifications thereof can be utilized without departing from its spirit and scope.

Having described the invention, I claim:

1. A computing weighing scale system having an operating cycle comprising, in combination, a computer for computing the value of a commodity according to its weight factor and a selected price factor, means for setting up the weight factor in the computer, photosensitive means for entering the selected price factor in the computer in patterns of binary price bits, and interlock means for adding parity bits to the price bits to prevent initiation or completion of said cycle if the photosensitive means fails to pass a parity check according to a verification code in which the sum of the price and parity bits for each number place in the price factor is always even or always odd.

2. A computing weighing scale system according to claim 1 wherein the photosensitive means includes printing plate means for printing the commodity name.

3. A computing weighing scale system having an operating cycle comprising, in combination, a computer for computing the value of a commodity according to its weight factor and a selected price factor, means for setting up the weight factor in the computer, photosensitive means for entering the selected price factor in the computer according to a binary code, the photosensitive means including light source means for activating the photosensitive means, a plate defining openings and mask means for covering selected openings in a pattern of binary price bits according to the selected price factor, the plate masking the photosensitive means from the light source means according to said pattern to control the photosensitive means, the plate further defining an additional parity opening for each number place in said price factor and the mask means further covering the parity openings in a pattern of parity bits according to a verification code for each number place in the price factor in which the total number of price and parity bits in each permissible code expression is always even or always odd, and circuit means for producing an inhibit signal in response to the detection of a code expression which is not permissible.

4. A computing weighing scale system having an operating cycle comprising, in combination, a computer for computing the value of a commodity according to its weight factor and a selected price factor, means for setting up the weight factor in the computer, photosensitive means for entering the selected price factor in the computer according to a binary code as an array of price bits for each decimal place in the price factor, interlock means adding a parity bit to the array of price bits in each said decimal place to produce a permissible code expression for said decimal place in which the total number of price and parity bits in each permissible code expression is always even or always odd and including circuit means for detecting whether the code expressions are even or odd, the interlock means being for preventing initiation or completion of said cycle if one or more said code expressions is not permissible.

5. A computing weighing scale system having an operating cycle comprising, in combination, a computer for computing the value of a commodity according to its weight factor and a selected price factor, means for setting up the weight factor in the computer, photosensitive means for entering the selected price factor in the computer according to a binary code, the photosensitive means including light source means for activating the photosensitive means, a plate defining openings and mask means for covering selected openings in a pattern of binary bits according to the selected price factor, the plate masking the photosensitive means from the light source means according to said pattern to control the photosensitive means, and interlock means for preventing initiation or completion of said cycle in the absence of the mask means.

6. A computing weighing scale system having an operating cycle comprising, in combination, a computer for computing the value of a commodity according to its weight factor and a selected price factor, means for setting up the weight factor in the computer, photosensitive means for entering the selected price factor in the computer according to a binary code, the photosensitive means including light source means for activating the photosensitive means, a plate defining openings and mask means defining openings for covering selected openings in a pattern of binary bits according to the selected price factor, the plate and the mask means masking the photosensitive means from the light source means according to said pattern to control the photosensitive means, and interlock means for preventing initiation or completion of said cycle in the presence of a plugged opening.

* * * * *